United States Patent
Ariyoshi

(10) Patent No.: US 11,906,323 B2
(45) Date of Patent: Feb. 20, 2024

(54) MAP GENERATION APPARATUS

(71) Applicant: Honda Motor Co., Ltd., Tokyo (JP)

(72) Inventor: Tokitomo Ariyoshi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 19 days.

(21) Appl. No.: 17/676,185

(22) Filed: Feb. 20, 2022

(65) Prior Publication Data

US 2022/0268594 A1 Aug. 25, 2022

(30) Foreign Application Priority Data

Feb. 25, 2021 (JP) .................................. 2021-028502

(51) Int. Cl.
*G01C 21/00* (2006.01)
*G01C 21/32* (2006.01)
*G01C 21/36* (2006.01)

(52) U.S. Cl.
CPC ......... *G01C 21/3815* (2020.08); *G01C 21/32* (2013.01); *G01C 21/3602* (2013.01); *G01C 21/3841* (2020.08)

(58) Field of Classification Search
None
See application file for complete search history.

(56) References Cited

U.S. PATENT DOCUMENTS

| 2017/0122749 A1* | 5/2017 | Urano ..................... G01S 19/42 |
| 2017/0269602 A1* | 9/2017 | Nakamura ........... G05D 1/0214 |
| 2018/0231387 A1* | 8/2018 | Thiel .................. G01C 21/3811 |
| 2021/0309231 A1* | 10/2021 | Fujita ................. G01C 21/3602 |

FOREIGN PATENT DOCUMENTS

| CN | 110654372 A | * | 1/2020 | ............ B60W 30/00 |
| JP | 2014104853 A | | 6/2014 | |

OTHER PUBLICATIONS

Machine translation of CN-110654372-A (Year: 2020).*

* cited by examiner

*Primary Examiner* — Anne Marie Antonucci
*Assistant Examiner* — Kyle S Park
(74) *Attorney, Agent, or Firm* — Duft & Bornsen, PC

(57) ABSTRACT

A map generation apparatus including a microprocessor. The microprocessor is configured to perform recognizing another vehicle traveling on an opposite lane opposite to a current lane on which a subject vehicle travels, acquiring an information of an external situation around the other vehicle in a route matching section when the other vehicle is recognized, the information of the external situation being obtained by the other vehicle traveling on the opposite lane, the route matching section being a section in which a driving route of the subject vehicle and a driving route of the other vehicle match in a driving route including the current lane and the opposite lane, and generating a map for the opposite lane in the route matching section, based on the information of the external situation.

11 Claims, 5 Drawing Sheets

FIG. 4A
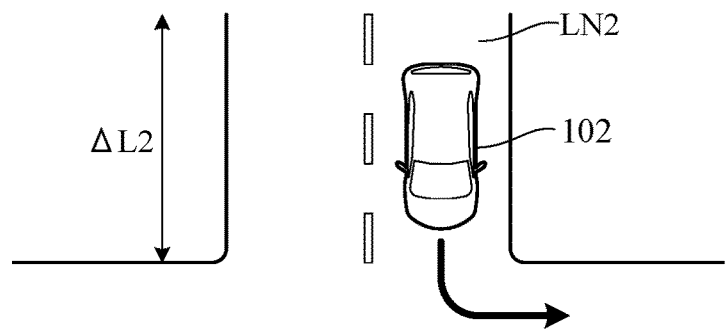
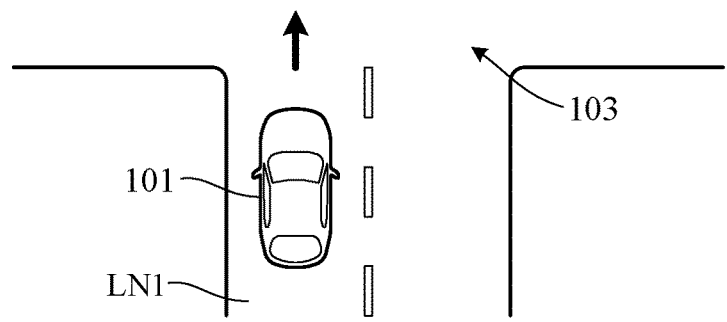
FIG. 4B
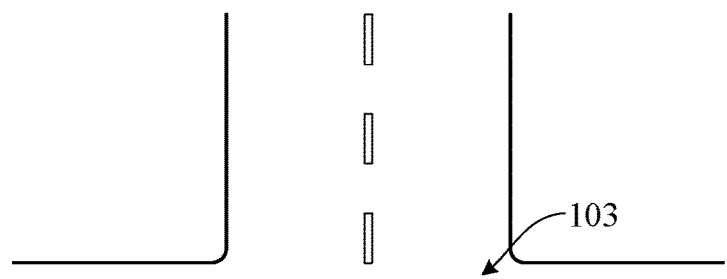
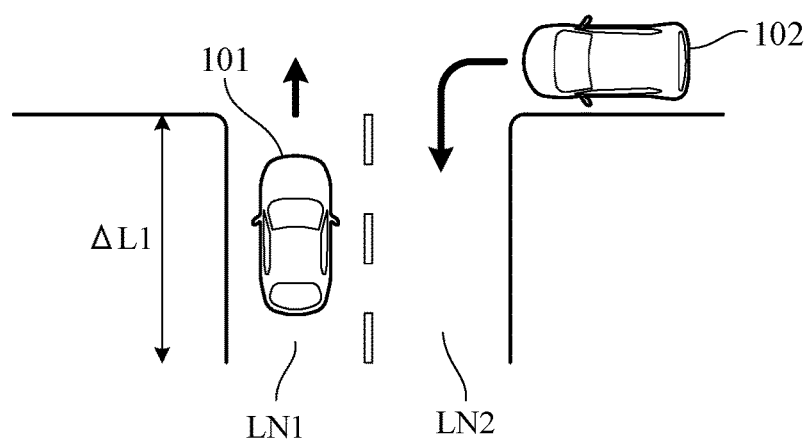

MAP GENERATION APPARATUS

CROSS-REFERENCE TO RELATED APPLICATION

This application is based upon and claims the benefit of priority from Japanese Patent Application No. 2021-028502 filed on Feb. 25, 2021, the content of which is incorporated herein by reference.

BACKGROUND OF THE INVENTION

Field of the Invention

This invention relates to a map generation apparatus configured to generate a map around a subject vehicle.

Description of the Related Art

Conventionally, there is a known apparatus in which white lines of a lane and a parking lot frame are recognized using an image captured by a camera mounted on a vehicle, and the recognition results of the white lines are used for vehicle driving control and parking support. Such an apparatus is described, for example, in Japanese Unexamined Patent Publication No. 2014-104853 (JP2014-104853A). In the apparatus disclosed in JP2014-104853A, edge points at which a change in luminance in the captured image is equal to or greater than a threshold is extracted, and the white lines are recognized based on the edge points.

In the apparatus described in JP2014-104853A, a white line is recognized for a lane on which a subject vehicle has actually traveled. Therefore, in order to generate a map including position information of the white line, it is necessary for the subject vehicle to actually travel in each lane, and it is difficult to efficiently generate the map.

SUMMARY OF THE INVENTION

An aspect of the present invention is a map generation apparatus including an electronic control unit including a microprocessor and a memory connected to the microprocessor. The microprocessor is configured to perform recognizing another vehicle traveling on an opposite lane opposite to a current lane on which a subject vehicle travels, acquiring an information of an external situation around the other vehicle in a route matching section when the other vehicle is recognized, the information of the external situation being obtained by the other vehicle traveling on the opposite lane, the route matching section being a section in which a driving route of the subject vehicle and a driving route of the other vehicle match in a driving route including the current lane and the opposite lane, and generating a map for the opposite lane in the route matching section, based on the information of the external situation.

BRIEF DESCRIPTION OF THE DRAWINGS

The objects, features, and advantages of the present invention will become clearer from the following description of embodiments in relation to the attached drawings, in which:

FIG. 4A is a view illustrating another example of a traveling scene to which the map generation apparatus according to the embodiment of the invention is applied;

FIG. 4B is a view illustrating a further other example of a traveling scene to which the map generation apparatus according to the embodiment of the invention is applied.

DETAILED DESCRIPTION OF THE INVENTION

Hereinafter, an embodiment of the present invention is explained with reference to FIGS. 1 to 5. A map generation apparatus according to an embodiment of the invention is applied to a vehicle having a self-driving capability, i.e., a self-driving vehicle, for example. The self-driving vehicle having the map generation apparatus may be sometimes called "subject vehicle" to differentiate it from other vehicles. The subject vehicle is an engine vehicle having an internal combustion engine (engine) as a travel drive source, electric vehicle having a travel motor as the travel drive source, or hybrid vehicle having both of the engine and the travel motor as the travel drive source. The subject vehicle can travel not only in a self-drive mode in which a driving operation by a driver is unnecessary, but also in a manual drive mode in which the driving operation by the driver is necessary.

Figure 1:
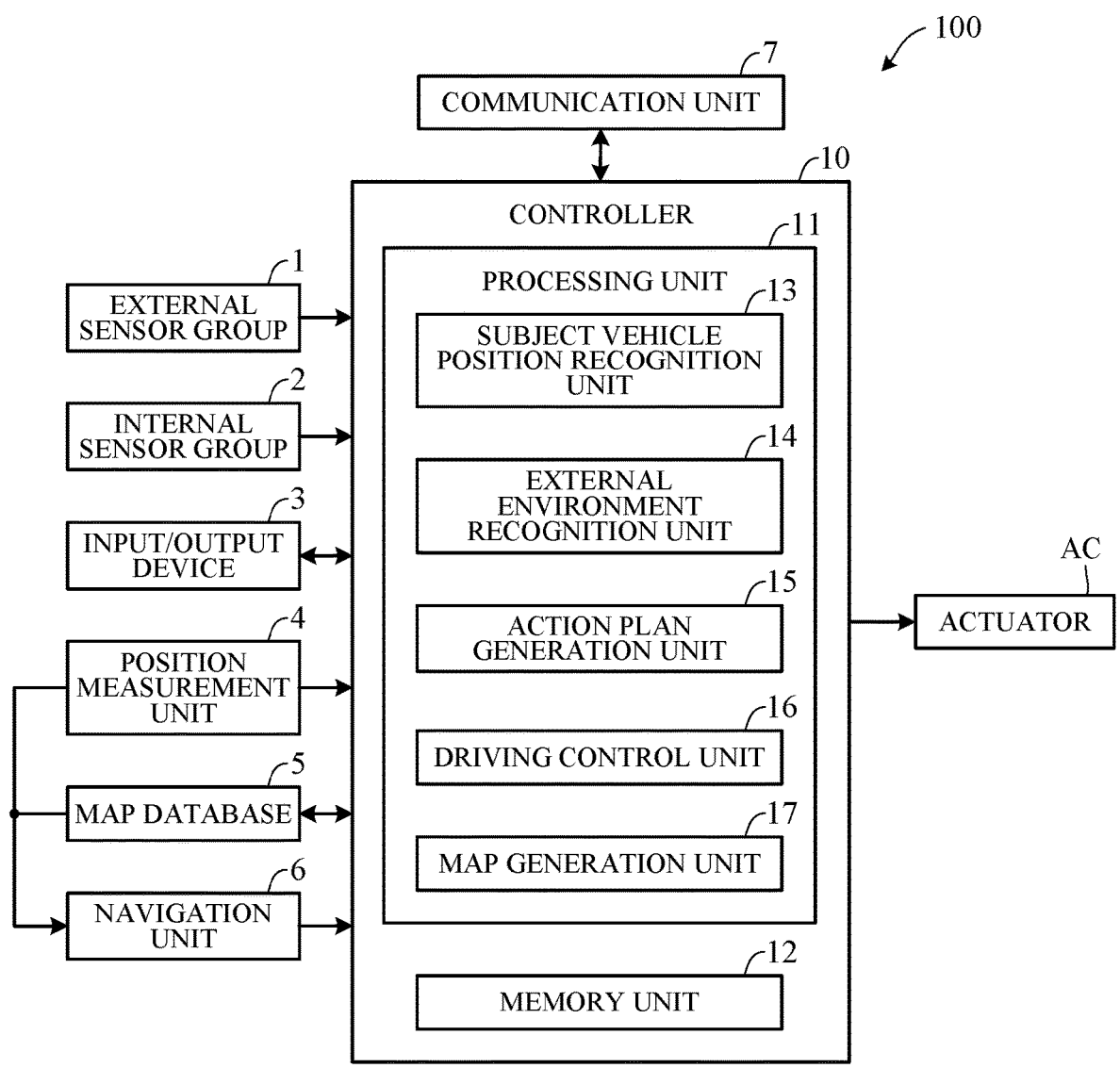
FIG. 1 is a block diagram schematically illustrating an overall configuration of a vehicle control system having a map generation apparatus according to an embodiment of the present invention.

First, the general configuration of the subject vehicle for self-driving will be explained. FIG. 1 is a block diagram schematically illustrating an overall configuration of a vehicle control system 100 of the subject vehicle having the map generation apparatus according to an embodiment of the present invention. As shown in FIG. 1, the vehicle control system 100 mainly includes a controller 10, and an external sensor group 1, an internal sensor group 2, an input/output device 3, a position measurement unit 4, a map database 5, a navigation unit 6, a communication unit 7 and actuators AC which are communicably connected with the controller 10.

The term external sensor group 1 herein is a collective designation encompassing multiple sensors (external sensors) for detecting external circumstances constituting subject vehicle ambience data. For example, the external sensor group 1 includes, inter alia, a LIDAR (Light Detection and Ranging) for measuring distance from the subject vehicle to ambient obstacles by measuring scattered light produced by laser light radiated from the subject vehicle in every direction, a RADAR (Radio Detection and Ranging) for detecting other vehicles and obstacles around the subject vehicle by radiating electromagnetic waves and detecting reflected waves, and a CCD, CMOS or other image sensor-equipped on-board cameras for imaging subject vehicle ambience (forward, reward and sideways).

The term internal sensor group 2 herein is a collective designation encompassing multiple sensors (internal sensors) for detecting driving state of the subject vehicle. For example, the internal sensor group 2 includes, inter alia, a vehicle speed sensor for detecting vehicle speed of the subject vehicle, acceleration sensors for detecting forward-rearward direction acceleration and lateral acceleration of the subject vehicle, respectively, rotational speed sensor for detecting rotational speed of the travel drive source, a yaw rate sensor for detecting rotation angle speed around a vertical axis passing center of gravity of the subject vehicle and the like. The internal sensor group 2 also includes sensors for detecting driver driving operations in manual drive mode, including, for example, accelerator pedal operations, brake pedal operations, steering wheel operations and the like.

The term input/output device 3 is used herein as a collective designation encompassing apparatuses receiving instructions input by the driver and outputting information to the driver. The input/output device 3 includes, inter alia, switches which the driver uses to input various instructions, a microphone which the driver uses to input voice instructions, a display for presenting information to the driver via displayed images, and a speaker for presenting information to the driver by voice.

The position measurement unit (GNSS unit) 4 includes a position measurement sensor for receiving signal from positioning satellites to measure the location of the subject vehicle. The positioning satellites are satellites such as GPS satellites and Quasi-Zenith satellite. The position measurement unit 4 measures absolute position (latitude, longitude and the like) of the subject vehicle based on signal received by the position measurement sensor.

The map database 5 is a unit storing general map data used by the navigation unit 6 and is, for example, implemented using a magnetic disk or semiconductor element. The map data include road position data and road shape (curvature etc.) data, along with intersection and road branch position data. The map data stored in the map database 5 are different from high-accuracy map data stored in a memory unit 12 of the controller 10.

The navigation unit 6 retrieves target road routes to destinations input by the driver and performs guidance along selected target routes. Destination input and target route guidance is performed through the input/output device 3. Target routes are computed based on current position of the subject vehicle measured by the position measurement unit 4 and map data stored in the map database 35. The current position of the subject vehicle can be measured, using the values detected by the external sensor group 1, and on the basis of this current position and high-accuracy map data stored in the memory unit 12, target route may be calculated.

The communication unit 7 communicates through networks including the Internet and other wireless communication networks to access servers (not shown in the drawings) to acquire map data, travel history information, traffic data and the like, periodically or at arbitrary times. In addition to acquiring travel history information, travel history information of the subject vehicle may be transmitted to the server via the communication unit 7. The networks include not only public wireless communications network, but also closed communications networks, such as wireless LAN, Wi-Fi and Bluetooth, which are established for a predetermined administrative area. Acquired map data are output to the map database 5 and/or memory unit 12 via the controller 10 to update their stored map data.

The actuators AC are actuators for traveling of the subject vehicle. If the travel drive source is the engine, the actuators AC include a throttle actuator for adjusting opening angle of the throttle valve of the engine (throttle opening angle). If the travel drive source is the travel motor, the actuators AC include the travel motor. The actuators AC also include a brake actuator for operating a braking device and turning actuator for turning the front wheels FW.

The controller 10 is constituted by an electronic control unit (ECU). More specifically, the controller 10 incorporates a computer including a CPU or other processing unit (a microprocessor) 51 for executing a processing in relation to travel control, the memory unit (a memory) 12 of RAM, ROM and the like, and an input/output interface or other peripheral circuits not shown in the drawings. In FIG. 1, the controller 10 is integrally configured by consolidating multiple function-differentiated ECUs such as an engine control ECU, a transmission control ECU and so on. Optionally, these ECUs can be individually provided.

The memory unit 12 stores high-accuracy detailed road map data (road map information) for self-driving. The road map information includes information on road position, information on road shape (curvature, etc.), information on gradient of the road, information on position of intersections and branches, information on type and position of division line such as white line, information on the number of lanes, information on width of lane and the position of each lane (center position of lane and boundary line of lane), information on position of landmarks (traffic lights, signs, buildings, etc.) as a mark on the map, and information on the road surface profile such as unevennesses of the road surface, etc. The map information stored in the memory unit 12 includes map information (referred to as external map information) acquired from the outside of the subject vehicle through the communication unit 7, and map information (referred to as internal map information) created by the subject vehicle itself using the detection values of the external sensor group 1 or the detection values of the external sensor group 1 and the internal sensor group 2.

The external map information is, for example, information of a map (called a cloud map) acquired through a cloud server, and the internal map information is information of a map (called an environmental map) consisting of point cloud data generated by mapping using a technique such as SLAM (Simultaneous Localization and Mapping). The external map information is shared by the subject vehicle and other vehicles, whereas the internal map information is unique map information of the subject vehicle (e.g., map information that the subject vehicle has alone). In an area in which no external map information exists, such as a newly established road, an environmental map is created by the subject vehicle itself. The internal map information may be provided to the server or another vehicle via the communication unit 7. The memory unit 12 also stores information such as programs for various controls, and thresholds used in the programs.

As functional configurations in relation to mainly self-driving, the processing unit 11 includes a subject vehicle position recognition unit 13, an external environment recognition unit 14, an action plan generation unit 15, a driving control unit 16, and a map generation unit 17.

The subject vehicle position recognition unit 13 recognizes the position of the subject vehicle (subject vehicle position) on the map based on position information of the subject vehicle calculated by the position measurement unit 4 and map information stored in the map database 5. Optionally, the subject vehicle position can be recognized using map information stored in the memory unit 12 and ambience data of the subject vehicle detected by the external sensor group 1, whereby the subject vehicle position can be recognized with high accuracy. The movement information (movement direction, movement distance) of the subject vehicle is calculated based on the detection value of the internal sensor group 2, thereby it is also possible to recognize the position of the subject vehicle. Optionally, when the subject vehicle position can be measured by sensors installed externally on the road or by the roadside, the subject vehicle position can be recognized with high accuracy by communicating with such sensors through the communication unit 7.

The external environment recognition unit 14 recognizes external circumstances around the subject vehicle based on signals from cameras, LIDERs, RADARs and the like of the external sensor group 1. For example, it recognizes position, speed and acceleration of nearby vehicles (forward vehicle or rearward vehicle) driving in the vicinity of the subject vehicle, position of vehicles stopped or parked in the vicinity of the subject vehicle, and position and state of other objects. Other objects include traffic signs, traffic lights, road, buildings, guardrails, power poles, commercial signs, pedestrians, bicycles, and the like. The other objects (road) also include road division lines (white lines, etc.) and stop lines. Recognized states of other objects include, for example, traffic light color (red, green or yellow) and moving speed and direction of pedestrians and bicycles. A part of a stationary object among other objects, constitutes a landmark serving as an index of position on the map, and the external environment recognition unit 14 also recognizes the position and type of the landmark.

The action plan generation unit 15 generates a driving path (target path) of the subject vehicle from present time point to a certain time ahead based on, for example, a target route computed by the navigation unit 6, map information stored in the memory unit 12, subject vehicle position recognized by the subject vehicle position recognition unit 13, and external circumstances recognized by the external environment recognition unit 14. When multiple paths are available on the target route as target path candidates, the action plan generation unit 15 selects from among them the path that optimally satisfies legal compliance, safe efficient driving and other criteria, and defines the selected path as the target path. The action plan generation unit 15 then generates an action plan matched to the generated target path. An action plan is also called "travel plan". The action plan generation unit 15 generates various kinds of action plans corresponding to overtake traveling for overtaking the forward vehicle, lane-change traveling to move from one traffic lane to another, following traveling to follow the preceding vehicle, lane-keep traveling to maintain same lane, deceleration or acceleration traveling. When generating a target path, the action plan generation unit 15 first decides a drive mode and generates the target path in line with the drive mode.

In self-drive mode, the driving control unit 16 controls the actuators AC to drive the subject vehicle along target path generated by the action plan generation unit 15. More specifically, the driving control unit 16 calculates required driving force for achieving the target accelerations of sequential unit times calculated by the action plan generation unit 15, taking running resistance caused by road gradient and the like into account. And the driving control unit 16 feedback-controls the actuators AC to bring actual acceleration detected by the internal sensor group 2, for example, into coincidence with target acceleration. In other words, the driving control unit 16 controls the actuators AC so that the subject vehicle travels at target speed and target acceleration. On the other hand, in manual drive mode, the driving control unit 16 controls the actuators AC in accordance with driving instructions by the driver (steering operation and the like) acquired from the internal sensor group 2.

The map generation unit 17 generates the environment map constituted by three-dimensional point cloud data using detection values detected by the external sensor group 1 during traveling in the manual drive mode. Specifically, an edge indicating an outline of an object is extracted from a camera image acquired by the camera based on luminance and color information for each pixel, and a feature point is extracted using the edge information. The feature point is, for example, an intersection of the edges, and corresponds to a road division line, a corner of a building, a corner of a road sign, or the like. The map generation unit 17 calculates the distance to the extracted feature point and sequentially plots the feature point on the environment map, thereby generating the environment map around the road on which the subject vehicle has traveled. The environment map may be generated by extracting the feature point of an object around the subject vehicle using data acquired by radar or LIDAR instead of the camera.

The subject vehicle position recognition unit 13 performs subject vehicle position estimation processing in parallel with map creation processing by the map generation unit 17. That is, the position of the subject vehicle is estimated based on a change in the position of the feature point over time. The map creation processing and the position estimation processing are simultaneously performed, for example, according to an algorithm of SLAM using signals from the camera or LIDAR. The map generation unit 17 can generate the environment map not only when the vehicle travels in the manual drive mode but also when the vehicle travels in the self-drive mode. If the environment map has already been generated and stored in the memory unit 12, the map generation unit 17 may update the environment map with a newly obtained feature point.

Figure 2:
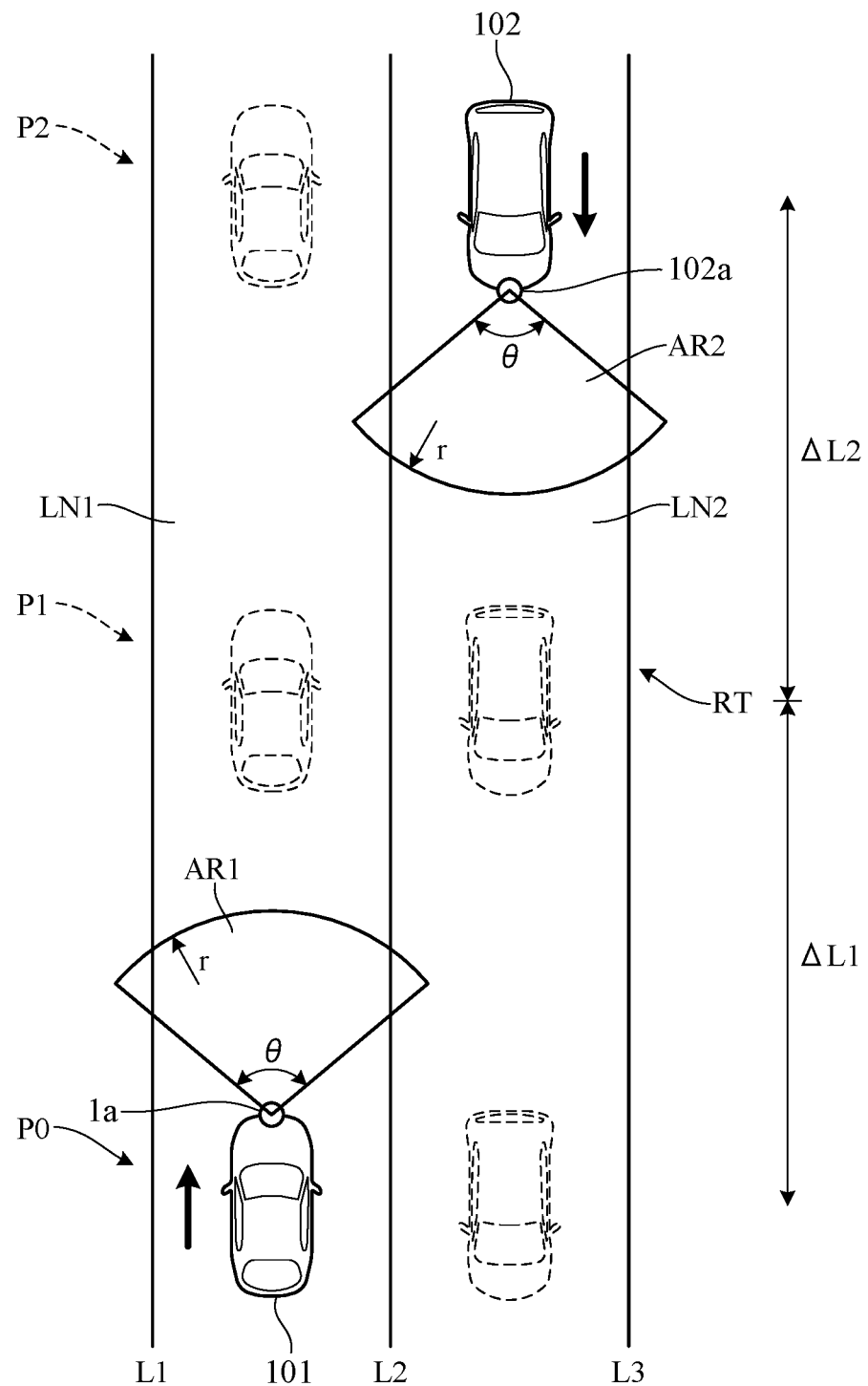
FIG. 2 is a view illustrating an example of a traveling scene to which the map generation apparatus according to the embodiment of the invention is applied.

A configuration of a map generation apparatus according to the present embodiment will be described. FIG. 2 is a diagram illustrating an example of a driving scene to which the map generation apparatus according to the present embodiment is applied, and illustrates a middle of a scene in which a subject vehicle 101 travels from a point A (for example, home) to a point B (for example, a store) as the destination while generating an environmental map in a manual drive mode. More specifically, a scene in which the vehicle travels on a current lane (first lane LN1) defined by left and right division lines L1 and L2 is illustrated. FIG. 2 also illustrates other vehicle 102 traveling on an opposite lane opposite to the current lane, that is, an opposite lane (second lane LN2) defined by left and right division lines L2 and L3.

The division lines L1 to L3 are, for example, solid or broken white lines. For the subject vehicle 101, the first lane LN1 is an outward path to a destination, and the second lane LN2 is a return path at the time of returning from the destination. The first lane LN1 and the second lane LN2 are adjacent to each other. FIG. 2 illustrates an example in which the outward path and the return path are configured by the single lanes LN1 and LN2, respectively, but at least one of the outward path and the return path may be configured by a plurality of lanes.

In FIG. 2, the subject vehicle 101 and other vehicle 102 at a current time point T0 are indicated by solid lines, and the subject vehicle 101 and other vehicle 102 at a first time point T1 after a lapse of a predetermined time from the current time point T0 and the subject vehicle 101 and other vehicle 102 at a second time point T2 after a lapse of a predetermined time from the first time point T1 are indicated by dotted lines. The positions of the subject vehicle 101 at the current time point T0, the first time point T1, and the second time point T2 are referred to as a current point P0, a first point P1, and a second point P2, respectively. At the current point P0, other vehicle 102 is located in front of the subject vehicle 101, at the first point P1, the subject vehicle 101 passes other vehicle 102, and at the second point P2, other vehicle 102 is located behind the subject vehicle 101.

The first lane LN1 and the second lane LN2 extend in parallel to each other and are located on the same driving route RT. In the driving route RT, a section from the current point P0 to the first point P1 is a section (referred to as a pre-passing section) ΔL1 before the subject vehicle 101 and other vehicle 102 approach each other and pass each other, and a section from the first point P1 to the second point P2 is a section (referred to as a post-passing section) ΔL2 after the subject vehicle 101 and other vehicle 102 pass each other and the subject vehicle 101 is away from other vehicle 102.

A camera 1a is mounted on a front portion of the subject vehicle 101. The camera 1a has a unique viewing angle θ determined by the performance of the camera and a maximum detection distance r. An inside of a fan-shaped area AR1 having a radius r and a central angle θ centered on the camera 1a is a range of an external space detectable by the camera 1a, that is, a detectable area AR1. The detectable area AR1 includes, for example, a plurality of division lines L1 and L2. Note that, in a case where a part of the viewing angle of the camera 1a is blocked by the presence of components disposed around the camera 1a, the detectable area AR1 may be different from that illustrated in the drawing.

A camera 102a similar to that of the subject vehicle 101 is also mounted on a front portion of other vehicle 102. A detectable area AR2 by the camera 102a is, for example, the same as the detectable area AR1, and an inside of a fan-shaped range having a radius r and a central angle θ centered on the camera 102a is the detectable range. The detectable area AR2 includes, for example, a plurality of division lines L2 and L3. That is, in the present embodiment, the detectable area AR1 of the camera 1a of the subject vehicle 101 and the detectable area AR2 of the camera 102a of other vehicle 102 include the same division line L2 among the division lines L1 to L3. Note that the detectable areas AR1 and AR2 are determined not only by the performance of the cameras 1a and 102a but also by the vehicle types to which the cameras 1a and 102a are attached, the attachment positions of the cameras 1a and 102a, and the like, and the detectable area AR1 and the detectable area AR2 may be different from each other.

In such a driving scene, by extracting edge points from an image of the camera 1a acquired while the subject vehicle 101 travels on the current lane, it is possible to generate an environmental map of the current lane (first lane LN1) included in the detectable area AR1. That is, the subject vehicle 101 actually travels on the outward path which is the first lane LN1, so that it is possible to obtain an environmental map (outward path map) of the outward path. After traveling on the outward path, the subject vehicle 101 actually travels on the return path, which is the second lane LN2, to obtain a camera image of the return path, so that it is possible to generate an environmental map (return path map) of the return path.

However, when the environmental map of the return path cannot be obtained until the vehicle actually travels on the return path after traveling on the outward path, the number of man-hours required for map generation increases, and map generation cannot be efficiently performed. Therefore, in order to enable efficient map generation, the present embodiment configures a map generation apparatus as follows.

Figure 3:
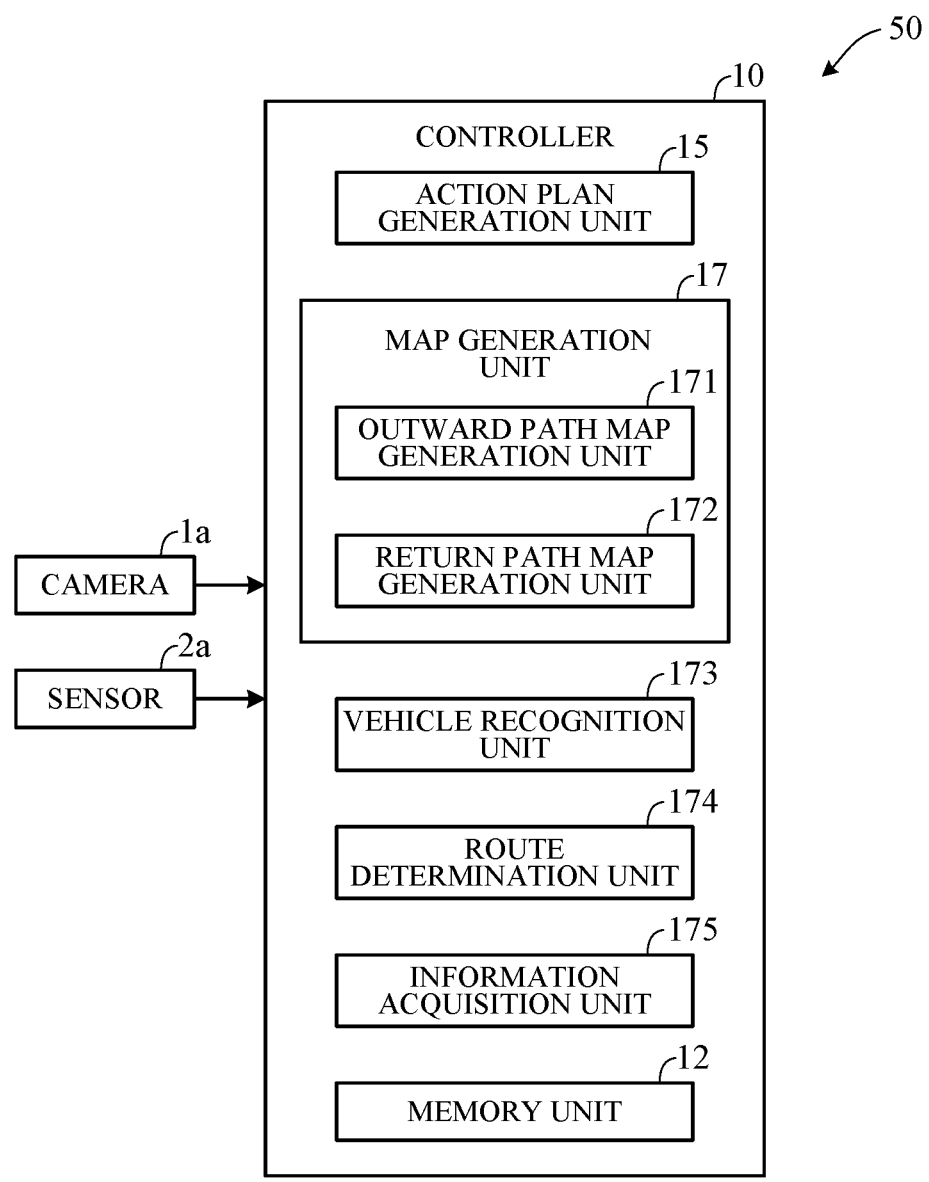
FIG. 3 is a block diagram illustrating a configuration of a substantial part of the map generation apparatus according to the embodiment of the invention.

FIG. 3 is a block diagram illustrating a main configuration of a map generation apparatus 50 according to the present embodiment. The map generation apparatus 50 constitutes a part of a vehicle control system 100 in FIG. 1. As illustrated in FIG. 3, the map generation apparatus 50 has a controller 10, a camera 1a, and a sensor 2a.

The camera 1a is a monocular camera having an imaging element (image sensor) such as a CCD or a CMOS, and constitutes a part of the external sensor group 1 in FIG. 1. The camera 1a may be a stereo camera. The camera 1a is attached to, for example, a predetermined position in the front portion of the subject vehicle 101 (FIG. 2), continuously captures an image of a space in front of the subject vehicle 101, and acquires an image (camera image) of a target object. The target object includes a building or a sign around the subject vehicle 101 and a division line (for example, the division lines L1 and L2 in FIG. 2) on a road. Note that the target object may be detected by a LiDAR or the like instead of the camera 1a or together with the camera 1a.

The sensor 2a is a detection part used to calculate a movement amount and a movement direction of the subject vehicle 101. The sensor 2a is a part of the internal sensor group 2, and includes, for example, a vehicle speed sensor and a yaw rate sensor. That is, the controller 10 (for example, a subject vehicle position recognition unit 13 in FIG. 1) calculates the movement amount of the subject vehicle 101 by integrating a vehicle speed detected by the vehicle speed sensor, calculates a yaw angle by integrating the yaw rate detected by the yaw rate sensor, and estimates a position of the subject vehicle 101 by odometry. For example, when the vehicle travels in the manual drive mode, the position of the subject vehicle is estimated by odometry when the environmental map is created. Note that the configuration of the sensor 2a is not limited thereto, and the position of the subject vehicle may be estimated using information of other sensor.

The controller 10 in FIG. 3 has a vehicle recognition unit 173, a route determination unit 174, and an information acquisition unit 175 in addition to an action plan generation unit 15 and a map generation unit 17, as a functional configuration of a processing unit 11 (FIG. 1). The vehicle recognition unit 173, the route determination unit 174, and the information acquisition unit 175 have a map generation function. Therefore, these units can also be included in the map generation unit 17.

The vehicle recognition unit 173 recognizes other vehicle 102 traveling on the opposite lane (second lane LN2), on the basis of the camera image acquired by the camera 1a. Other vehicle 102 traveling on the opposite lane includes not only other vehicle 102 before passing which travels in front of the subject vehicle 101 but also other vehicle 102 after passing which travels behind the subject vehicle 101. Other vehicle 102 may be recognized by a radar, a LiDAR, or the like. The vehicle recognition unit 173 may recognize other vehicle 102 by acquiring position information of other vehicle 102 via a communication unit 7.

When other vehicle 102 is recognized by the vehicle recognition unit 173, the route determination unit 174 estimates the driving route of other vehicle 102 on the basis of the camera image. Then, it is determined whether or not there is a section (referred to as a route matching section) in which the driving route of the subject vehicle 101 and the driving route of other vehicle 102 match in the driving route RT including the current lane and the opposite lane. For example, in the example of FIG. 2, each of the pre-passing section ΔL1 in which the subject vehicle 101 and other vehicle 102 approach each other and the post-passing section ΔL2 in which the subject vehicle 101 and other vehicle 102 are separated from each other is the route matching section.

The pre-passing section ΔL1 and the post-passing section ΔL2 can be regarded as the following sections in a state where the subject vehicle 101 has moved to the point P1 (FIG. 2). That is, the pre-passing section ΔL1 is a section in which a route on which the subject vehicle 101 has already traveled matches with a route on which other vehicle 102 is scheduled to travel in the future, and the post-passing section ΔL2 is a section in which a route on which the subject vehicle 101 is scheduled to travel in the future matches with a route on which other vehicle 102 has already traveled.

The route matching section does not always include the pre-passing section ΔL1 and the post-passing section ΔL2. FIGS. 4A and 4B are diagrams illustrating an example in which the subject vehicle 101 traveling on the current lane (first lane LN1) and other vehicle 102 traveling on the opposite lane (second lane LN2) pass each other at an intersection. FIG. 4A illustrates an example in which the subject vehicle 101 goes straight through an intersection 103, while other vehicle 102 turns left at the intersection 103. In this case, other vehicle 102 does not travel on the route on which the subject vehicle 101 has already traveled, and the route matching section is only the post-passing section ΔL2. On the other hand, FIG. 4B illustrates an example in which, when the subject vehicle 101 goes straight through the intersection 103, other vehicle 102 enters the intersection 103 and travels on the second lane LN2. In this case, the subject vehicle 101 does not travel on the route on which other vehicle 102 has already traveled, and the route matching section is only the pre-passing section ΔL1.

Note that, in the route matching section, the subject vehicle 101 and other vehicle 102 do not always pass each other. For example, when the subject vehicle 101 passes through the intersection 103 after other vehicle 102 turns left at the intersection 103 in FIG. 4A, or when other vehicle 102 enters the intersection 103 after the subject vehicle 101 passes through the intersection 103 in FIG. 4B, the passing between the subject vehicle 101 and other vehicle 102 does not occur. However, even in this case, there is a section in which the route on which the subject vehicle 101 travels or has traveled matches with the route on which other vehicle 102 travels or has traveled, and there is a route matching section.

The determination as to whether there is a route matching section is made for other vehicle 102 recognized by the vehicle recognition unit 173. Therefore, other vehicle 102 recognized by the vehicle recognition unit 173 includes, in addition to other vehicle 102 (FIG. 2) traveling on the opposite lane (second lane LN2) at the current time point T0, other vehicle 102 (FIG. 4A) traveling on the opposite lane at a past time point and other vehicle 102 (FIG. 4B) scheduled to travel on the opposite lane at a future time point. That is, even if other vehicle 102 does not travel on the opposite lane at the current time point T0, there is a case where there is a route matching section with the subject vehicle 101, and all other vehicles 102 having a possibility of having a route matching section with the subject vehicle 101 are included in other vehicle 102 recognized by the vehicle recognition unit 173.

When it is determined by the route determination unit 174 that there is a route matching section between the subject vehicle 101 and other vehicle 102, the information acquisition unit 175 acquires information from other vehicle 102 via the communication unit 7. That is, information is acquired by inter-vehicle communication. Specifically, information on an external situation around other vehicle 102, such as an image acquired by the camera 102a of other vehicle 102 in the route matching section, is acquired. The information includes a division line, a lane width, a road shape, a road surface state, construction information, accident information, and the like in the route matching section. Instead of the camera 102a, a signal from a radar, a LiDAR, or the like mounted on other vehicle 102 may be acquired. Similarly to the subject vehicle 101, other vehicle 102 may generate the environmental map on the basis of the image of the camera 102a. In this case, the information acquisition unit 175 may acquire information of the environmental map generated by other vehicle 102.

The map generation unit 17 has an outward path map generation unit 171 that generates an environmental map of an outward path (outward path map) and a return path map generation unit 172 that generates an environmental map of a return path (return path map). At the time of traveling on the outward path in the manual drive mode, the outward path map generation unit 171 extracts feature points of objects around the subject vehicle 101 on the basis of the camera image acquired by the camera 1a, and estimates the subject vehicle position by the sensor 2a, thereby generating the environmental map of the outward path. The generated outward path map is stored in the memory unit 12. The outward path map generation unit 171 recognizes the positions of the division lines L1 and L2 (FIG. 2A) in the detectable area AR1 of the camera 1a, and stores the division line information in map information (for example, internal map information).

At the time of traveling on the outward path in the manual drive mode, the return path map generation unit 172 generates the environmental map of the return path under a condition that a return path map generation condition is established. The return path map generation condition is established when it is determined by the route determination unit 174 that there is a route matching section. On the other hand, when it is determined that the return path map generation condition is not established at the time of traveling on the outward path in the manual drive mode, the environmental map of the return path is not generated at the time of traveling on the outward path. In this case, at the time of traveling on the return path in the manual drive mode, similarly to the outward path map generation unit 171, the return path map generation unit 172 extracts feature points of objects around the subject vehicle 101 on the basis of the camera image, and estimates the subject vehicle position by the sensor 2a, thereby generating the environmental map of the return path. The generated return path map is stored in the memory unit 12.

When the return path map generation condition is established at the time of traveling on the outward path, the return path map generation unit 172 generates the environmental map of the return path on the basis of the information acquired by the information acquisition unit 175. That is, the return path map is generated on the basis of information indicating an external situation around other vehicle 102 in the route matching section, specifically, the camera image. As a result, the return path map is obtained before the subject vehicle 101 travels on the return path. The generated return path map is stored in the memory unit 12. The return path map generation unit 172 recognizes the positions of the division lines L2 and L3 (FIG. 2A) in the detectable area AR2 of the camera 102a, and stores the division line information in map information (for example, internal map information). Note that, at the time of traveling on the outward path in the manual drive mode, the map generation unit 17 generates the return path map by the return path map generation unit 172 while generating the outward path map by the outward path map generation unit 71. That is, the outward path map and the return path map are simultaneously generated. After the outward path map is generated, the return path map may be generated.

When the subject vehicle 101 travels on the return path in the self-drive mode, the action plan generation unit 15 sets a target route using the return path map stored in the memory unit 12. The driving control unit 16 (FIG. 1) controls an actuator AC so that the subject vehicle 101 automatically travels along the target route. As a result, even when the subject vehicle 101 travels on the return path for the first time, the subject vehicle can travel in the self-drive mode using the environmental map of the return path obtained at the time of traveling on the outward path.

Figure 5:
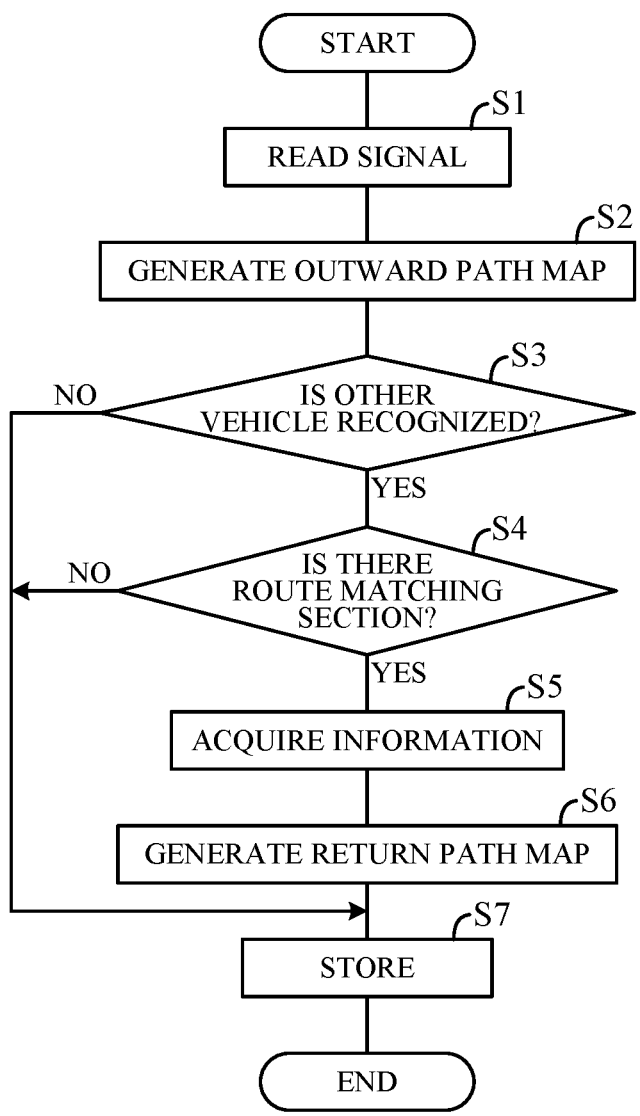
FIG. 5 is a flowchart illustrating an example of processing executed by a controller in FIG. 3.

FIG. 5 is a flowchart illustrating an example of processing executed by the controller 10 of FIG. 3 according to a predetermined program. The processing illustrated in the flowchart is started when the vehicle travels on the first lane LN1 in the manual drive mode, and is repeated at a predetermined cycle. Note that the processing of FIG. 5 will be described below with reference to FIG. 2.

As illustrated in FIG. 5, first, signals from the camera 1a and the sensor 2a are read in S1 (S: processing step). Next, in S2, an environmental map at the current point P0 of the current lane (first lane LN1), that is, an outward path map is generated on the basis of the read signals (camera image or the like). Next, in S3, it is determined whether or not other vehicle 102 traveling on the opposite lane (second lane LN2) is recognized around the subject vehicle 101, on the basis of the camera image or the like read in S1. In a case where the result of determination in S3 is YES, the process proceeds to S4, and in a case where the result of determination in S3 is NO, the process passes S4 to S6 and proceeds to S7.

In S4, the driving route of other vehicle 102 is estimated on the basis of the camera image and the like read in S1. The estimated driving route includes not only a route on which other vehicle 102 currently travels but also a route on which other vehicle 102 has traveled in the past and a route on which other vehicle 102 is expected to travel in the future. For example, in the processing at the time point T1 when the subject vehicle 101 is located at the point P1 in FIG. 2, a driving route (past route) from the point P2 to the point P1 of other vehicle 102 and a route (future route) from the point P2 to the point P0 are included. Further, in S4, it is determined whether or not there is a section in which the estimated driving route of other vehicle 102 and the driving route of the subject vehicle 101 match, that is, a route matching section. In a case where the result of determination in S4 is YES, the process proceeds to S5, and in a case where the result of determination in S4 is NO, the process passes S5 and S6 and proceeds to S7.

In S5, information in the route matching section, specifically, information such as a camera image is acquired from other vehicle 102 by inter-vehicle communication via the communication unit 7. Next, in S6, an environmental map for the opposite lane, that is, a return path map is generated on the basis of the acquired information (camera image or the like). Next, in S7, the outward path map generated in S2 and the return path map generated in S6 are stored in the memory unit 12, and the processing ends.

Note that the processing of S5 may be performed every time the processing of the flowchart is repeated, but when other vehicle 102 has a function of storing information, the stored information may be collectively acquired from other vehicle 102 at predetermined timing instead of being performed every time the processing is repeated. For example, until the subject vehicle 101 reaches the first point P1 from the point P0 in FIG. 2, the information is not acquired even if other vehicle 102 is recognized, and when the subject vehicle reaches the first point P1, information of the post-passing section ΔL2 may be collectively acquired from other vehicle 102. As a result, the processing load on the controller 10 can be reduced.

In addition, information may not be acquired when it is determined in S4 that there is a route matching section, and information may be collectively acquired when it is determined that the length of the route matching section is a predetermined length or more. As a result, in a case where other vehicle 102 simply crosses the opposite lane, such as a case where other vehicle 102 travels on a road intersecting the current lane, information is not acquired from other vehicle 102, and it is possible to prevent acquisition of useless information having a low utility value for generating the return path map.

The operation of the map generation apparatus 50 according to the present embodiment is summarized as follows. As illustrated in FIG. 2, when the subject vehicle 101 travels on the current lane (first lane LN1) in the manual drive mode, the environmental map in the detectable area AR1 of the camera 1a including the position information of the division lines L1 and L2 is generated on the basis of the camera image (S2). At this time, when other vehicle 102 traveling on the opposite lane (second lane LN2) is recognized from the camera image of the subject vehicle 101, information in a route matching section in which the driving route of the subject vehicle 101 and the driving route of other vehicle 102 match, for example, information of the camera image obtained by other vehicle 102 is acquired from other vehicle 102 (S5). That is, information obtained when other vehicle 102 travels in the post-passing section ΔL2 from the point P2 to the point P1 and information obtained when other vehicle travels in the pre-passing section ΔL1 from the point P1 to the point P0 are acquired.

As a result, even before the subject vehicle 101 actually travels on the return path in the manual drive mode, a return path map which is a map of the opposite lane can be generated (S6). Therefore, the subject vehicle 101 can travel on the return path in the self-drive mode on the basis of the return path map. In a case where the subject vehicle 101 does not travel in the self-drive mode but travels on the return path while generating the environmental map of the return path in the manual drive mode, the return path map information (S7) already stored in the memory unit 12 at the time of traveling on the outward path can be used. Therefore, it is not necessary to generate the return path map from the beginning, and the processing load of the controller 10 can be reduced.

According to the present embodiment, following functions and effects can be achieved.

(1) The map generation apparatus 50 includes: a vehicle recognition unit 173 that recognizes other vehicle 102 traveling on an opposite lane (second lane LN2) opposite to a current lane (first lane LN1) on which the subject vehicle 101 travels; an information acquisition unit 175 that, when other vehicle 102 is recognized by the vehicle recognition unit 173, acquires information of an external situation around other vehicle 102 in a route matching section (pre-passing section ΔL1 and post-passing section ΔL2) in which a driving route of the subject vehicle 101 and a driving route of other vehicle 102 match in a driving route RT including the current lane and the opposite lane, obtained by other vehicle 102 traveling on the opposite lane; and a map generation unit 17 (return path map generation unit 172) that generates a map, that is, a return path map for the opposite lane in the route matching section, on the basis of the information acquired by the information acquisition unit 175 (FIGS. 2 and 3). As a result, even before the subject vehicle 101 travels on the return path after traveling on the outward path, the subject vehicle 101 can generate the return path map by itself, and the map generation can be efficiently performed.

(2) The map generation apparatus 50 further includes a route determination unit 174 that determines whether or not there is the route matching section (FIG. 3). When it is determined by the route determination unit 174 that there is the route matching section, the information acquisition unit 175 acquires information of the external situation around other vehicle 102 in the route matching section (FIG. 5). As a result, since the information of the external situation around other vehicle 102 having a high utility value for generating the return path map is acquired, it is possible to suppress acquisition of useless information.

(3) The route matching section includes a section in which a route on which the subject vehicle 101 is scheduled to travel and a route on which other vehicle 102 has already traveled match, that is, the post-passing section ΔL2 (FIGS. 2 and 4A). As a result, the driving route of the subject vehicle 101 after passing other vehicle 102 can be reliably matched with the route on which other vehicle 102 has actually traveled, and the reliability of the route matching in the route matching section is high.

(4) The route matching section also includes a section in which a route on which the subject vehicle 101 has already traveled matches with a route on which other vehicle 102 is scheduled to travel, that is, the pre-passing section ΔL1 (FIGS. 2 and 4B). As a result, it is possible to acquire information of the driving route on the return path corresponding to the driving route on the outward path on which the vehicle has actually traveled, and it is possible to acquire useful information for generating the return path map.

(5) The map generation apparatus 50 further includes a camera 1a that detects an external situation around the subject vehicle 101 (FIG. 3). The map generation unit 17 (outward path map generation unit 171) further generates a map for the current lane, that is, an outward path map on the basis of the external situation detected by the camera 1a (FIG. 5). As a result, the outward path map and the return path map can be simultaneously generated during traveling on the outward path, and thus it is possible to efficiently generate a map.

(6) The map generation apparatus 50 further includes a route setting unit (action plan generation unit 15) that sets a target route when the subject vehicle 101 travels on the opposite lane, on the basis of the map for the opposite lane generated by the map generation unit 17 (FIG. 3). This enables traveling in the self-drive mode even before traveling in the manual drive mode for generating the environmental map.

The above embodiment may be modified into various forms. Some modifications will be described below. In the above embodiment, the external sensor group 1, which is an in-vehicle detection device such as the camera 1a, detects the external situation around the subject vehicle 101. However, the external situation may be detected using a detection device such as a LiDAR other than the camera 1a or a detection unit other than the in-vehicle detection device. In the above embodiment, the information acquisition unit 175 communicates with other vehicle 102 by inter-vehicle communication via the communication unit 7 and acquires information and the like obtained by other vehicle 102. However, the map information may be acquired via a server device, and the configuration of an information acquisition unit is not limited to the configuration described above.

In the above embodiment, the map generated by the map generation unit 17 is stored in the memory unit 12. However, the map information may be transmitted to the server device via the communication unit 7 so that other vehicle 102 can use the map information. Alternatively, the map information may be directly transmitted to other vehicle 102 via the inter-vehicle communication. In the above embodiment, the vehicle recognition unit 173 recognizes other vehicle 102 traveling on the opposite lane, on the basis of the camera image. However, other vehicle may be recognized on the basis of information of other detection units such as a LiDAR or via communication (road-to-vehicle communication) between the communication unit installed on the road and the subject vehicle 101 (inter-vehicle communication). Therefore, the configuration of a vehicle recognition unit is not limited to the configuration described above. In the above embodiment, it is determined whether or not there is a route matching section by recognizing the driving route of other vehicle 102 from the image from the camera 1a. However, it may be determined whether or not there is the route matching section by recognizing the driving route of other vehicle 102 from the information obtained via the communication unit 7, and the configuration of a route determination unit is not limited to the configuration described above.

In the above embodiment, the map generation unit 17 generates the environmental map of the outward path at the current point P0 (current time point T0) on the basis of the camera image acquired by the camera 1a, and generates the environmental map of the return path using the information from other vehicle 102 acquired by the information acquisition unit 175. However, the outward path map and the return path map may not be generated at the same time. When the outward path map is already generated, the map generation unit 17 (the return path map generation unit 172) may generate only the return path map on the basis of information from other vehicle 102. Therefore, the configuration of a map generation unit is not limited to the configuration described above.

In the above embodiment, the example in which the map generation apparatus is applied to the self-driving vehicle has been described. That is, the example in which the self-driving vehicle generates the environmental map has been described. However, the present invention can be similarly applied to a case where a manual driving vehicle having or not having a driving support function generates the environmental map.

The present invention can also be used as a map generation method including recognizing another vehicle 102 traveling on an opposite lane LN2 opposite to a current lane LN1 on which a subject vehicle 101 travels, acquiring an information of an external situation around the other vehicle in a route matching section when the other vehicle 102 is recognized, the information of the external situation being obtained by the other vehicle 102 traveling on the opposite lane LN2, the route matching section being a section in which a driving route of the subject vehicle 101 and a driving route of the other vehicle 102 match in a driving route RT including the current lane LN1 and the opposite lane LN2, and generating a map for the opposite lane in the route matching section based on the information of the external situation acquired in the acquiring.

The above embodiment can be combined as desired with one or more of the above modifications. The modifications can also be combined with one another.

According to the present invention, a map generation can be efficiently performed.

Above, while the present invention has been described with reference to the preferred embodiments thereof, it will be understood, by those skilled in the art, that various changes and modifications may be made thereto without departing from the scope of the appended claims.

What is claimed is:

1. A map generation apparatus including a first vehicle and a second vehicle communicating with each other by an inter-vehicle communication, the first vehicle traveling on a first lane, and the second vehicle traveling on a second lane opposite to the first lane, each of the first vehicle and the second vehicle comprising:
   a communication unit capable of communicating with each other; and
   a detection device that detects an external situation therearound, wherein
   the first vehicle further comprises
   an electronic control unit including a microprocessor and a memory connected to the microprocessor; and
   the microprocessor is configured to perform:
   recognizing the second vehicle traveling on the second lane;
   acquiring information of the external situation around the second vehicle detected by the detection device of the second vehicle in a route matching section through the communication unit when the second vehicle is recognized, the route matching section being a section in which a driving route of the first vehicle and a driving route of the second vehicle match in a driving route including the first lane and the second lane; and
   generating a map for the first lane based on the information of the external situation around the first vehicle detected by the detection device of the first vehicle, and a map for the second lane in the route matching section based on the information of the external situation around the second vehicle acquired from the second vehicle through the communication unit.

2. The map generation apparatus according to claim 1, wherein
   the microprocessor is configured to further perform
   determining whether the route matching section exists, and
   the microprocessor is configured to perform
   the acquiring including acquiring the information of the external situation around the second vehicle in the route matching section through the communication unit when it is determined that the route matching section exists.

3. The map generation apparatus according to claim 2, wherein
   the route matching section is a section in which a route on which the first vehicle is scheduled to travel and a route on which the second vehicle has already traveled match.

4. The map generation apparatus according to claim 2, wherein
   the route matching section is a section in which a route on which the first vehicle has already traveled and a route on which the second vehicle is scheduled to travel match.

5. The map generation apparatus according to claim 1, wherein
   the microprocessor is configured to perform
   the generating including generating the map for the second lane while generating the map for the first lane.

6. The map generation apparatus according to claim 1, wherein
   the second lane is defined by left and right division lines,
   the microprocessor is configured to perform
   the acquiring including acquiring information on positions of the left and right division lines, and
   the detection device of the first vehicle detects one of the left and right division lines.

7. The map generation apparatus according to claim 1, wherein
   the microprocessor is configured to further perform
   setting a target route when the first vehicle travels on the second lane, based on the map for the second lane.

8. The map generation apparatus according to claim 7, wherein
   the first vehicle is a self-driving vehicle having a self-driving capability, and
   the microprocessor is configured to perform
   the setting including setting the target route used when the first vehicle travels on the second lane by self-driving.

9. The map generation apparatus according to claim 1, wherein
   the second vehicle further comprises
   an electronic control unit including a microprocessor and a memory connected to the microprocessor,
   the microprocessor of the second vehicle is configured to perform
   generating a map for the second lane based on the information of the external situation around the second vehicle detected by the detection device of the second vehicle, and
   the microprocessor of the first vehicle is configured to perform
   the acquiring including acquiring the map for the second lane generated by the second vehicle through the communication unit, and
   the generating including generating the map for the second lane in the route matching section, based on the map for the second lane acquired from the second vehicle.

10. The map generation apparatus according to claim 1, wherein
    the detection device is a camera.

11. A map generation method, generating a map through an inter-vehicle communication between a first vehicle traveling on a first lane and a second vehicle traveling on a second lane opposite to the first lane, each of the first vehicle and the second vehicle including a communication unit capable of communicating with each other and a detection device that detects an external situation therearound, the map generation method comprising:
    recognizing the second vehicle traveling on the second lane;
    acquiring information of the external situation around the second vehicle detected by the detection device of the second vehicle in a route matching section through the communication unit when the second vehicle is recognized, the route matching section being a section in which a driving route of the first vehicle and a driving route of the second vehicle match in a driving route including the first lane and the second lane; and generating a map for the first lane based on the information of the external situation around the first vehicle detected by the detection device of the first vehicle, and a map for the second lane in the route matching section based on the information of the external situation around the second vehicle acquired from the second vehicle.

* * * * *